United States Patent
Rentschler et al.

(10) Patent No.: US 8,788,136 B2
(45) Date of Patent: Jul. 22, 2014

(54) METHOD AND DEVICE FOR LANE KEEPING ASSISTANCE REGULATION

(71) Applicants: Tobias Rentschler, Pforzheim (DE); Florian Hauler, Karlsruhe (DE)

(72) Inventors: Tobias Rentschler, Pforzheim (DE); Florian Hauler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/654,046

(22) Filed: Oct. 17, 2012

(65) Prior Publication Data
US 2013/0096767 A1    Apr. 18, 2013

(30) Foreign Application Priority Data
Oct. 17, 2011    (DE) .......................... 10 2011 084 611

(51) Int. Cl.
*G01C 22/00*    (2006.01)

(52) U.S. Cl.
USPC ................. 701/28; 701/301; 701/70; 701/41; 701/36; 701/48; 340/903; 340/933; 340/436; 340/440; 340/407.1

(58) Field of Classification Search
USPC ............................................. 701/41, 36, 301
See application file for complete search history.

(56) References Cited

U.S. PATENT DOCUMENTS

| | | | |
|---|---|---|---|
| 2002/0095246 A1* | 7/2002 | Kawazoe | 701/1 |
| 2004/0143381 A1* | 7/2004 | Regensburger et al. | 701/36 |
| 2005/0174223 A1* | 8/2005 | Egami et al. | 340/440 |
| 2005/0273261 A1* | 12/2005 | Niwa et al. | 701/301 |
| 2007/0027597 A1* | 2/2007 | Breuel et al. | 701/41 |
| 2008/0278349 A1* | 11/2008 | Kataoka et al. | 340/933 |
| 2010/0079590 A1* | 4/2010 | Kuehnle et al. | 348/118 |
| 2010/0185363 A1* | 7/2010 | Buerkle et al. | 701/41 |
| 2010/0222976 A1* | 9/2010 | Haug | 701/70 |

FOREIGN PATENT DOCUMENTS

| | | |
|---|---|---|
| DE | 10 2004 024 692 | 12/2005 |
| DE | 10 2004 047 889 | 4/2006 |
| DE | 10 2008 040 626 | 2/2010 |
| EP | 1674361 | 6/2006 |

* cited by examiner

*Primary Examiner* — Redhwan k Mawari
(74) *Attorney, Agent, or Firm* — Kenyon & Kenyon LLP

(57) ABSTRACT

In a lane keeping assistance method for a vehicle which is traveling in a lane, it is checked whether an activation criterion for an automatic driving dynamics intervention is satisfied, and in response to the satisfaction of the activation criterion, control signals are output for the driving dynamics intervention. A remaining travel time to crossing or reaching a lateral lane line is ascertained and compared to a threshold value as the activation criterion. During the automatic driving dynamics intervention, a deactivation criterion for ending the automatic driving dynamics intervention is checked, the deactivation criterion including a comparison of a vehicle alignment to a lane direction.

8 Claims, 4 Drawing Sheets

METHOD AND DEVICE FOR LANE KEEPING ASSISTANCE REGULATION

BACKGROUND OF THE INVENTION

1. Field of the Invention

The present invention relates to a device and a method for lane keeping assistance for a motor vehicle.

2. Description of the Related Art

Lane keeping assistance systems having automatic intervention in the vehicle dynamics or automatic lane correction are also designated as intervening lane keeping assistance systems, LDP (lane departure prevention), LKS (lane keeping system) or LKAS (lane keeping assistant system).

The lane keeping assistance systems detect the vehicle's driving environment using a driving environment sensor system, and intervene in the vehicle dynamics so as to prevent the vehicle from leaving the lane. In this case, different actuators of the vehicle may be activated, particularly the vehicle's steering and/or braking. Automatic interventions in vehicle steering are possible particularly in the case of electromechanical steering (EPS, electric power steering), active steering (AFS, active front steering) or RWS (rear wheel steering). Braking interventions may take place particularly by one-sided braking interventions or asymmetrical braking interventions. Because of the interventions in the vehicle's actuator system, a yaw torque is impressed about the vertical axis, which induces the vehicle to a yawing motion to prevent it from leaving the lane.

In this instance, LKS systems are known which are based on a continuous control variable, particularly the steering torque, and are active over the entire roadway width. Such regulations may be sensed as being unpleasant, since the control variable intervenes continuously and independently of the driver's intention. Other driver assistance systems are designed to undertake the intervention as a function of the exceeding of a control threshold. In such systems it is, however, disadvantageous that the control threshold typically acts independently of the position of the vehicle with respect to the roadway boundary, and with that, in the case of wide roadways, frequently intervenes too early.

Published German patent application document DE 10 2008 040 627 A1 describes a device and a method for operating a steering assistance system having adaptation in case of the approach of a driving environment object. In this instance, an intervention-free area at the edge of one's own lane is defined, outside of which no driving dynamics interventions of the lane keeping assistance system takes place.

BRIEF SUMMARY OF THE INVENTION

A method and a device for lane keeping assistance regulation are provided in accordance with the present invention, in which method an automatic intervention in the driving dynamics is initiated when a remaining driving time up to the crossing of the bordering lane line is undershot. This may thus represent an activation criterion for the control intervention, or intervention in the driving dynamics.

Consequently, an inner band of the lane of the vehicle is advantageously created in which no driving dynamics interventions of the lane keeping assistance regulation are initiated.

A deactivation criterion for ending the automatic driving dynamics intervention is designed to compare a vehicle alignment to the lane direction.

The vehicle alignment may be established, in this instance, by the travel direction, i.e. the directional information of the velocity vector of the vehicle or by the longitudinal axis of the vehicle. The lane direction is yielded as the current direction of the lane, and may be established, for example, by a tangent to the center line of the lane or a bordering lane line.

The deactivation criterion, in supplement to the comparison of the directions, may also include a minimum distance to the lane lines, so as not to permit an activation following up too rapidly. Consequently, the deactivation criterion may be formed by two or more sub-criteria.

The comparison of the directions may take place, for one thing, so that the deactivation criterion is satisfied when the vehicle alignment is parallel to the lane direction. Furthermore, the deactivation criterion may also be first achieved when the parallelism is exceeded, that is, when the angle of intersection of the vehicle direction and the lane direction changes sign.

Some advantages are achieved in accordance with the present invention.

While the automatic vehicle regulation is only initiated in an outer edge region of the lane, an inner region is advantageously not affected by this, so that in it, no guidance takes place disturbing the driver, or rather, no undesired driving dynamics interventions. Thus, the driver is able to drive a little to the left, e.g. undisturbed in the inner area of the lane, in order to have a better view of a bordering opposing traffic lane, for a subsequent passing procedure of a larger preceding vehicle, or drive a little to the right so as to pay better attention to traffic and information signs.

For this, checking the remaining travel time is of advantage, compared to, for instance, a pure comparison to a threshold value for the transverse distance from the laterally bordered lane line, since it permits, for instance, approaching at a small angle right up to close to the lane line, without already initiating an activation, when the driver deliberately wants to have a view of the preceding traffic space.

While the deactivation of the automatic vehicle intervention is not directed to a transverse distance or the leaving of a lateral edge region, but to a sufficient yawing motion of the vehicle at least parallel to the lane direction, it may be avoided that, in the edge region, continuously automatic driving dynamics regulating interventions are carried out and, after being terminated, are soon taken up again.

While the deactivation criterion advantageously demands that the angle of intersection of the directions carry out a sign change, and the vehicle thus yaws or pivots beyond the parallelism into the opposite direction, such continuously restarting regulations are able to be suppressed particularly easily.

On this is also based the realization that particularly also in cornering situations such over-yawing is rather of advantage. In a simple curve, the undershooting of the minimum distance will more likely occur at the outer curve lane line, thus on the right lane line in a left curve. A driving dynamics intervention, to the extent that the alignment of the vehicle takes place more strongly into the curve, helps in this case subsequently to lead the vehicle farther away from the outer lane line.

According to the present invention, a middle lane line, that is not drawn in the roadway, may be ascertained from camera signals and navigation signals, if necessary. In this connection, this case may be recognized when a lateral distance, ascertained from camera signals, between lane lines is detected as being too big and/or it is ascertained from map signals and navigation signals that a multi-lane roadway is present.

DETAILED DESCRIPTION OF THE INVENTION

Figure 1:
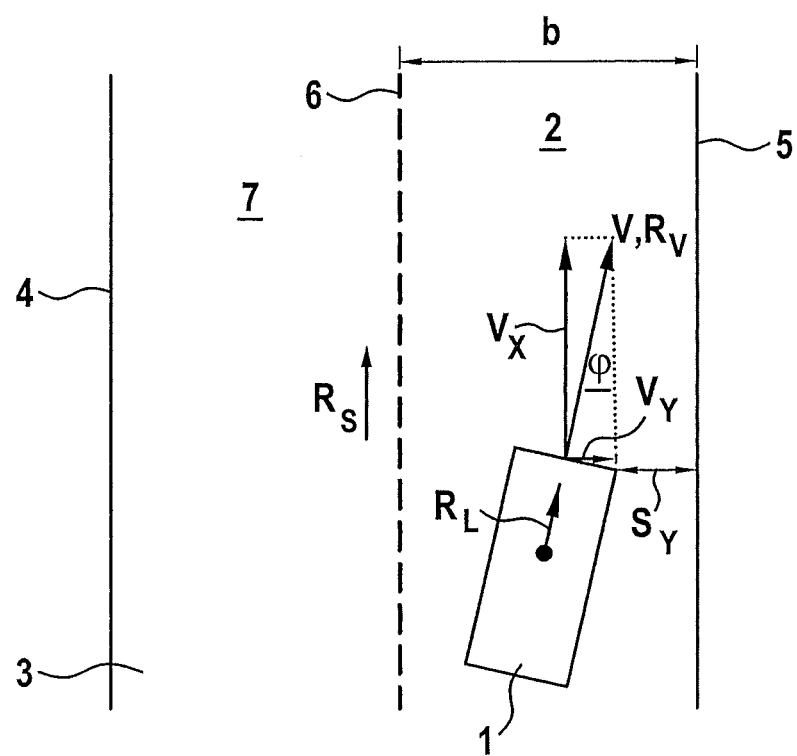
FIG. 1 shows a driving situation of a vehicle on a roadway during the carrying out of a method according to one specific embodiment of the present invention.
Figure 2:
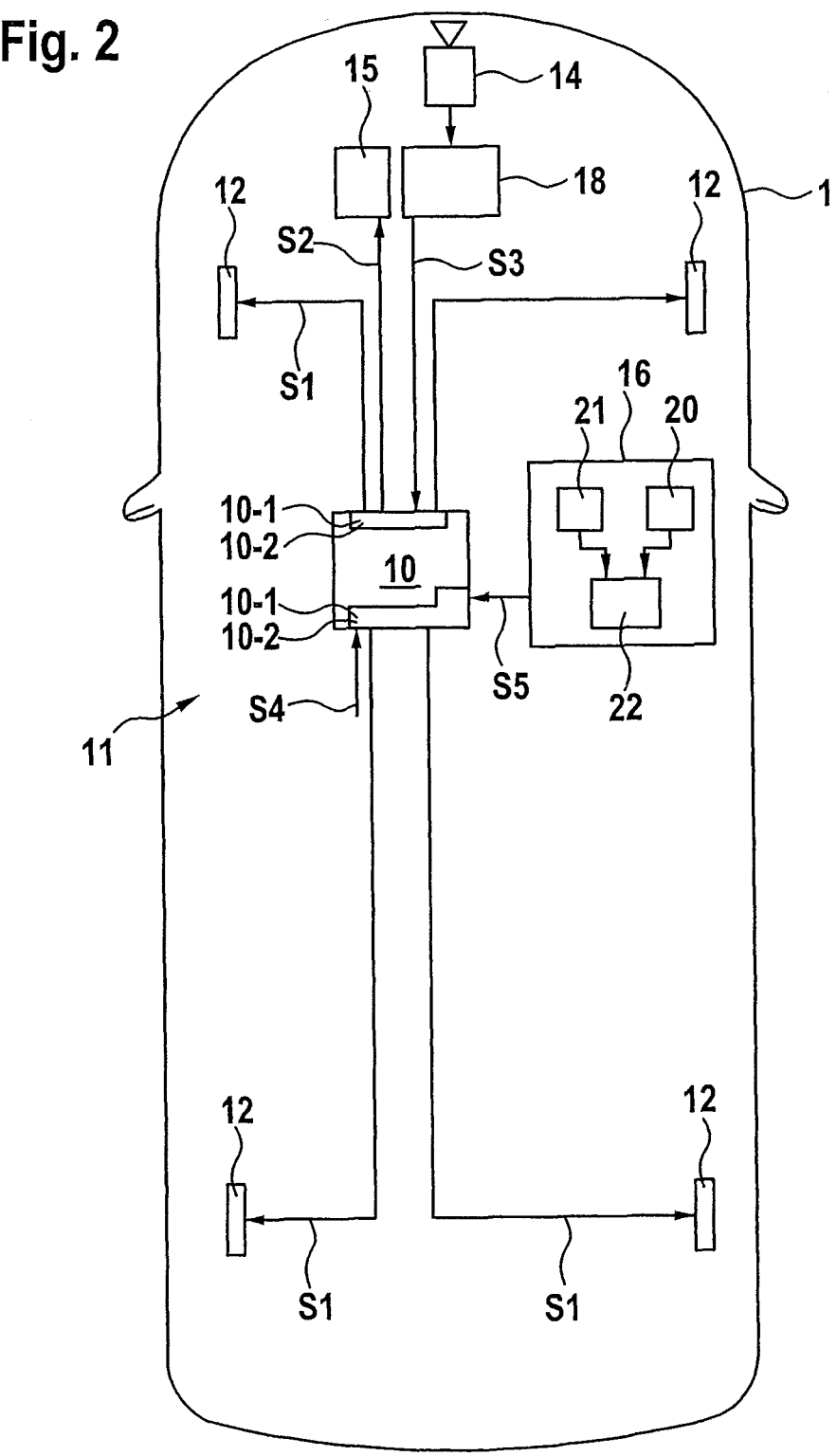
FIG. 2 shows the vehicle of FIG. 1 in an enlarged version.

A vehicle 1, according to FIG. 1, is traveling in a right lane 2 of a roadway 3. As shown, roadway 3 may have right lane 2 and a left lane 3, and is bordered laterally by lane lines 4 and 5; a middle lane line 6 separates the two lanes 2 and 7.

Lane direction Rs of lane 2 comes about as tangent to the bordering lane lines or as their average value.

Vehicle 2 is traveling at a travel speed v, whose direction Rv, according to FIG. 1, generally may deviate from lane direction Rx. Moreover, direction RL of the longitudinal axis of vehicle 2 may deviate from Rv and Rx.

According to FIG. 1, the indices x and y relate to lane 2; the x direction corresponds to lane direction Rs, and lateral direction y runs perpendicular to x.

The following applies to the composition of speed v:

$$v^2 = v_x^2 + v_y^2.$$

where $v_x$ represents the longitudinal component of the velocity in lane direction R and v represents the transverse velocity. Vehicle a is traveling at an angle of intersection $\phi$ to lane direction Rs. This gives vx=v sin $\phi$ and vy=v cos $\phi$.

The lane keeping assistance regulation includes an activation criterion (triggering criterion) K1 and a deactivation criterion K2 for an automatic driving dynamics intervention.

Vehicle 1 has a lane keeping assistance system 11 having a control device 10, lane keeping assistance system 11 being also able to be integrated into a driving dynamics control.

The driving dynamics intervention on the vehicle may include an automatic steering intervention in the case of, for instance, electromechanical steering or electric steering (EPS, electric power steering), and/or an automatic braking intervention, particularly a one-sided braking intervention or an asymmetric braking intervention. To carry out a driving dynamics intervention, control device 10 correspondingly actuates, via driving dynamics control signal S1, S2, directly or indirectly wheel brakes 12 and/or a steering intervention device 15, which is, for instance, a part of an electric or electromechanical steering system.

Activation criterion K1 over time of the lane keeping assistance regulation is determined by a remaining driving time (time to line crossing, TLC) $\tau$ until the crossing of a lane line 4, 5, thus, according to FIG. 1, of right lane line 5.

Time $\tau$ until crossing lane line 5 is thus yielded as:

$$\tau = \frac{s_y}{v_y}$$

where $s_y$ is defined, for instance, as the transverse distance of the outer physical bordering of vehicle 1 on lane line 5.

As triggering criterion K1, remaining travel time $\tau$ is now compared to a lower threshold value Ts. As a consequence, the following applies:

$$\tau \leq T_s,$$

i.e. the remaining travel time (time to line crossing) $\tau$ reaches or falls below lower threshold value Ts.

For this, lower threshold value Ts is selected so that it is located just below the human reaction time (driver perception reaction time $T_{reac}$ but still above the technical implementation time $T_{impl}$.

$$T_{reac} > T_S > T_{impl},$$

By the example of the functional impression via wheel brakes 12, this is consequently the pressure buildup time plus the time required for yawing or changing direction.

Figure 3:
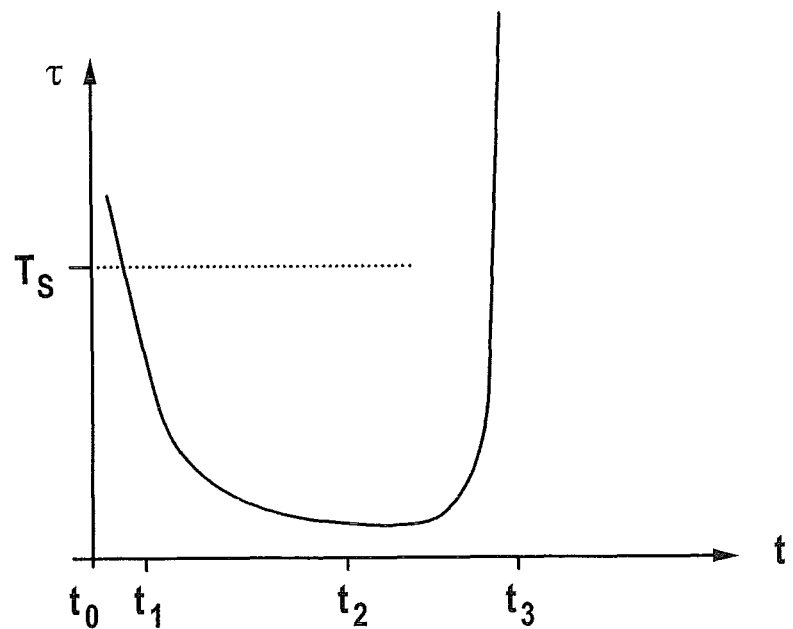
FIG. 3 shows a diagram of the curve over time of the respective currently remaining driving time.

FIG. 3 shows a travel scene as an example:

At time t0, vehicle 1 is still at a sufficient distance from right lane line 5, and at time t1, TLC falls below threshold value $T_s$, so that the driving dynamics intervention begins subsequently.

Thus, as of time t1, vehicle 1 at first still approaches lane line 5, but according to FIG. 3 at a decreasing slope, so that subsequently, after reaching a minimum at t2, it moves away from lane line 5 again.

For the deactivation of the driving dynamics intervention, a deactivation criterion K2 is provided. This deactivation criterion K2 includes a checking which may be developed according to alternatives K2a or K2b:

K2a: is the travel direction Rv (vector of v) and/or vehicle direction $R_L$ (direction of the longitudinal axis), again, parallel to lane direction Rs?

K2b: Has this parallelism between, on the one hand, travel direction Rv (vector of v) and/or vehicle direction $R_L$ (direction of the longitudinal axis) and, on the other hand, lane direction Rs already been crossed?

K2 may thus be aligned according to variant K2a with pure parallelism of Rv and Rs.

At parallelism of travel direction Rv to lane direction R, thus the remaining travel time $\tau$ becomes infinite, as at time t3 in the diagram of FIG. 3. Angle of intersection $\phi$ becomes zero.

If, according to variant K2b, crossing the parallelism is checked, what is checked is whether the angle of intersection changes its sign.

In supplement, an evaluation of transverse distance $S_y$ may also be included in the deactivation criterion, so that $S_y$ is, for instance, greater than 0.2 b, where b is the lane width of lane 2. Consequently, two sub-criteria then have to be satisfied.

The course of lane 2 in front of vehicle 1 is advantageously taken into account in order to take into consideration the non-straight course, for ascertaining the remaining travel time (TLC) $\tau$. The course of the lane may be monitored, for instance, via a camera system 14, 18, such as a stereo camera system in the front area of the vehicle, having a stereo camera 14 and its control device 18, which emits image signals S3 to control device 10. In supplement or alternatively, map data may be drawn upon about the course of the lane, which are made available by a navigational system 16 which, in a known manner, has a GPS receiver 20 for receiving GPS signals and a map memory 21 as well as a control device 22 which carries out map matching. Consequently, map matching and position determination are able to take place in the map data.

Methods for ascertaining the remaining travel time $\tau$ or rather time to line crossing, based on map data, for curved lane 2 are known as such.

Basically, for example, middle lane line 6 may not be drawn in, for instance, in the case of a country road, or even during road repairs on multi-lane expressways. This case may be recognized when a transverse distance, ascertained from camera signals, in this case, consequently 2b, for example, between lane lines 4 and 5 is detected as being too big and/or it is ascertained from map signals and navigation signals that a multi-lane roadway 3 is present. In this case, middle lane line 6 may be ascertained by having both lateral lane lines 4, 5 recorded by stereo camera 14 and ascertaining the position of middle lane 6 directly from this or by drawing upon the navigational data.

Figure 4:
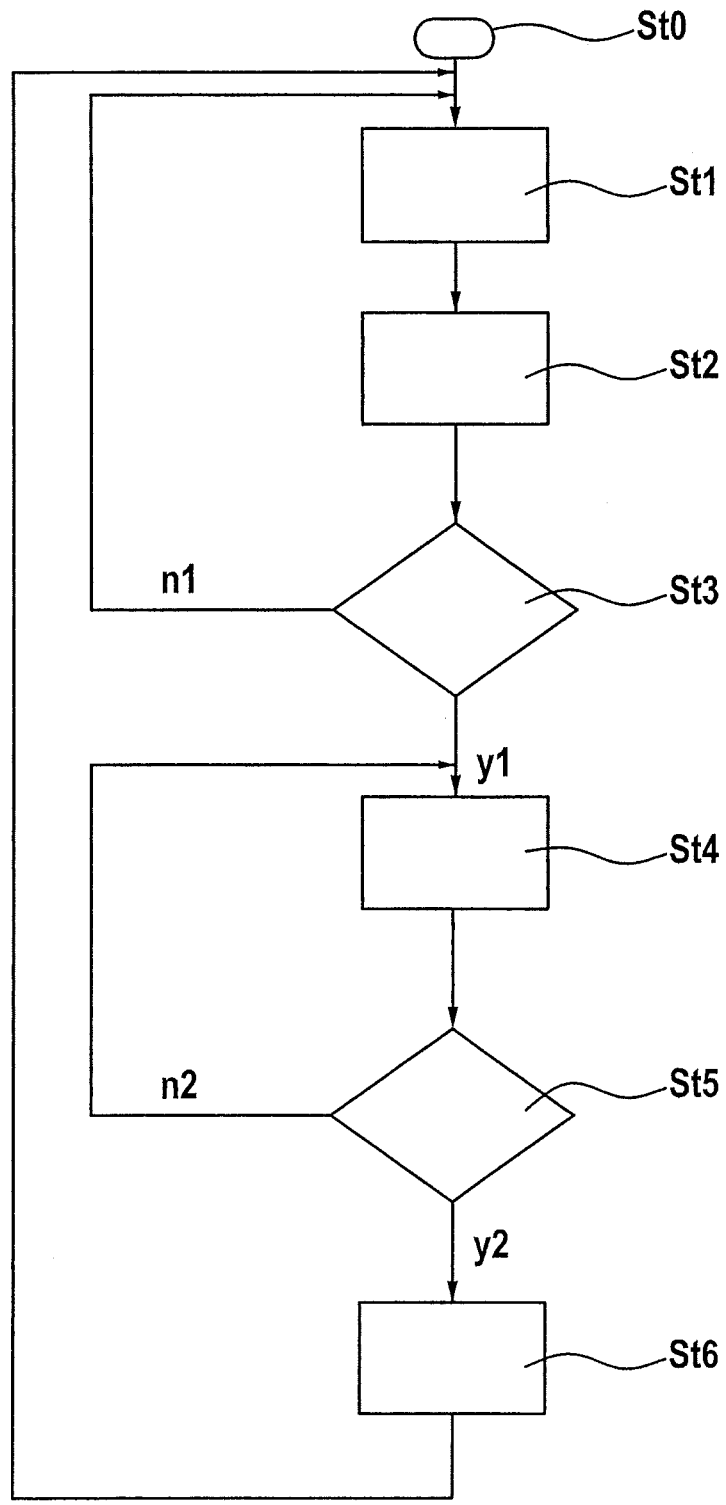
FIG. 4 shows a flow chart of a method according to the present invention.

The method according to the present invention thus starts at step St0, according to FIG. 4, that is, upon starting the driving dynamics control or starting the engine, or even during the trip, i.e. v>0. Subsequently, according to step St1, driving dynamics data are picked up continuously via the CAN bus of vehicle 1, and according to step St2, the remaining travel time (TLC) τ crossing or reaching one of lane lines 4, 5 is ascertained. If in decision step St3 activation criterion K1 is not satisfied, the method is set back again to before St1 according to branching n, and thus the loop of St1 and St2 is run through continually.

If activation criterion K1 is satisfied, i.e. $\tau \leq T_s$ is satisfied, then according to branching y1 subsequently in step St4, the driving dynamics control is started using an active driving dynamics intervention by, for example, an output of driving dynamics control signals S1, S2 for a braking intervention or a steering intervention, and it is checked continually, according to step St5, whether deactivation criterion K2 is satisfied. As long as K2 is not satisfied, according to branching n2, step St4 is carried out continually in a loop until, according to branching y2, deactivation criterion K2 is satisfied, and consequently in step St6 the driving dynamics intervention is ended and the method is reset to before step St1.

Control device 10, according to the present invention, of the lane keeping assistance regulation, has interfaces 10-1 for picking up camera signals S3, driving dynamics signals S4 and navigational signals S5, as well as an interface 10-2 for outputting braking control signals S1 and steering control signals S2, if necessary. Interfaces 10-1 and 10-2 may be formed by the CAN bus, for example.

What is claimed is:

1. An automated lane keeping assistance method for a vehicle traveling in a lane of a roadway, comprising:
    checking by a controller whether an activation criterion for an automatic driving dynamics intervention is satisfied; and
    outputting control signals for the automatic driving dynamics intervention, in the case the activation criterion is satisfied;
    wherein, as the activation criterion, a remaining travel time for one of crossing or reaching a lateral lane line of the traveled lane is ascertained and compared to a threshold value, and wherein during the automatic driving dynamics intervention, a deactivation criterion for ending the automatic driving dynamics intervention is checked, the deactivation criterion including a comparison of a vehicle alignment to a lane direction.

2. The method as recited in claim 1, wherein the deactivation criterion includes ascertainment of whether a parallelism of the vehicle alignment and the lane direction has been one of reached or crossed.

3. The method as recited in claim 1, wherein an angle of intersection between the vehicle alignment and the lane direction is ascertained, and wherein the deactivation criterion includes checking whether a sign change of the angle of intersection is occurring.

4. The method as recited in claim 2, wherein the deactivation criterion is formed exclusively by the comparison of the vehicle alignment to the lane direction.

5. The method as recited in claim 2, wherein the deactivation criterion includes at least one additional sub-criterion.

6. The method as recited in claim 5, wherein the at least one additional sub-criterion includes ascertainment of whether a transverse distance from a lane line of the traveled lane exceeds a minimum distance.

7. The method as recited in claim 2, wherein one of:
    (i) in the case the traveled lane is identified as having a width too wide for a single lane, and at least an additional third line within the traveled lane is not detected, ascertaining a position of a virtual third line within the traveled lane based on camera signals; or
    (ii) in the case navigation data indicate the traveled lane includes multi-lanes, and at least an additional third line within the traveled lane is not detected, ascertaining a position of a virtual third line within the traveled lane based on camera signals.

8. A control device for lane keeping assistance regulation, comprising:
    an input interface for receiving driving dynamics signals;
    a checking unit for checking whether an activation criterion for an automatic driving dynamics intervention is satisfied; and
    an output interface for outputting control signals for the automatic driving dynamics intervention, in the case the activation criterion is satisfied;
    wherein, as the activation criterion, a remaining travel time for one of crossing or reaching a lateral lane line of the traveled lane is ascertained and compared to a threshold value, and wherein during the automatic driving dynamics intervention, a deactivation criterion for ending the automatic driving dynamics intervention is checked, the deactivation criterion including a comparison of a vehicle alignment to a lane direction.

\* \* \* \* \*